(12) United States Patent
Neill

(10) Patent No.: US 6,350,327 B2
(45) Date of Patent: *Feb. 26, 2002

(54) PROCESS FOR MANUFACTURING PIPES

(75) Inventor: David Neill, Fife (GB)

(73) Assignee: Forth Tool & Valve Limited, Fife (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/384,183

(22) Filed: Aug. 27, 1999

(30) Foreign Application Priority Data

Aug. 27, 1998 (GB) .............................. 9818757

(51) Int. Cl.⁷ ................................. C21D 8/10
(52) U.S. Cl. ................... 148/521; 228/155; 228/156; 428/615; 428/586
(58) Field of Search ................. 148/519, 521; 228/155, 156; 428/615, 586

(56) References Cited

U.S. PATENT DOCUMENTS

| | | | |
|---|---|---|---|
| 3,753,704 A | * 8/1973 | Manilla et al. | 75/208 R |
| 4,016,008 A | * 4/1977 | Forbes Jones et al. | 138/140 |
| 4,518,111 A | 5/1985 | Hardwick | 228/107 |
| 4,630,351 A | 12/1986 | Kranz et al. | 29/527.2 |
| 4,744,504 A | 5/1988 | Turner | 228/127 |
| 4,795,078 A | * 1/1989 | Kuroki et al. | 228/131 |
| 4,977,034 A | 12/1990 | Wang | 428/548 |
| 4,995,548 A | 2/1991 | Wang et al. | 228/131 |
| 5,056,209 A | * 10/1991 | Ohashi et al. | 29/517 |
| 5,711,826 A | * 1/1998 | Nordstrom | 148/519 |
| 5,855,699 A | * 1/1999 | Oyama et al. | 148/519 |
| 5,940,951 A | * 8/1999 | Schulz et al. | 29/421.1 |
| 6,050,301 A | * 8/2000 | Yoshida et al. | 138/143 |

FOREIGN PATENT DOCUMENTS

| | | | |
|---|---|---|---|
| DE | 8605584 | 5/1986 | C23O/28/02 |
| EP | 0 451 967 | 10/1991 | B12K/20/08 |
| EP | 0 454 911 | 11/1991 | B21C/23/22 |
| GB | 1 188 995 | 4/1970 | B23K/9/16 |
| GB | 1 207 675 | 10/1970 | B21C/37/06 |
| GB | 2 141 645 | 1/1985 | B21C/37/06 |
| GB | 2 258 384 | 1/1993 | B21D/39/04 |
| JP | 58145381 | 8/1983 | B23K/20/00 |

OTHER PUBLICATIONS

Copy of Search Report issued by United Kingdom Patent Office in connection with Application No. GB 9920416.6.

* cited by examiner

*Primary Examiner*—Daniel J. Jenkins
(74) *Attorney, Agent, or Firm*—John S. Pratt; Micheal K. Dixon; Kilpatrick Stockton LLP

(57) ABSTRACT

A process for producing clad pipe comprises forming a hollow body (S10) of base material, bonding a cladding material metallurgically to the base material (S12) to form a composite body and subsequently extruding the composite body to form a pipe. This process allows the metallurgical bond to be validated using non-destructive methods prior to extrusion. Any areas that are unbonded will be detected, thereby reducing wastage. Moreover, because the metallurgical bond is achieved prior to extrusion, the cladding thickness is controlled during the extrusion process, avoiding migration of the clad material into the base material by disproportionate amounts.

7 Claims, 1 Drawing Sheet

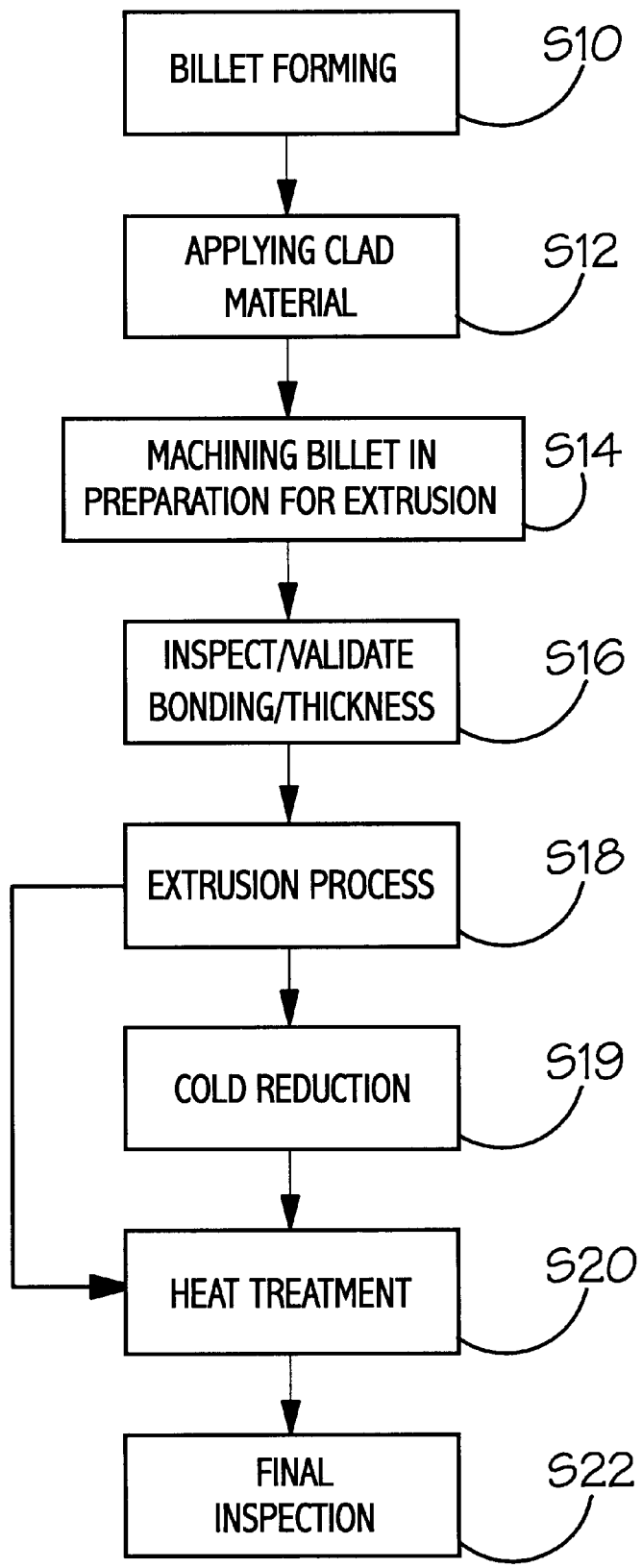

PROCESS FOR MANUFACTURING PIPES

The present invention relates to the manufacture of pipes and in particular, but not exclusively, to the manufacture of extruded pipes having an inner layer of a corrosion and/or erosion resistant material.

It is known to manufacture pipes by forming a tubular metal billet of volume equal to that of the eventual pipe and extruding the billet through an annular die of appropriate dimensions. This technique can also be used to manufacture pipes having a layer of cladding on their internal surface. Such pipes are widely used to provide a cost-effective solution for corrosion and/or erosion protection for internal surfaces of pipes. The base material of the pipe can be produced from relatively inexpensive material (typically carbon steel) and the liner or cladding can be chosen to take into account the service condition and may, for example, be corrosion or erosion resistant. The material forming the cladding layer is usually much more expensive that the base layer but by providing only a layer of cladding material the cost is significantly reduced.

Such clad pipes are currently produced by inserting a tube of corrosion resistant cladding material into a tubular billet (typically of carbon steel) and extruding the composite billet thus formed in the conventional manner. The resultant pipe is formed with an internal layer of cladding and the changes which the billet undergoes during extrusion cause the cladding material and the base material to be metallurgically bonded to one another. Although the known technique is very useful it is known to produce inconsistencies in bonding and because of this the eventual wastage from the completed product is high. Furthermore, it has been found that by using this method it is very difficult to control the clad thickness, since the cladding material migrates into the base material by a disproportionate amount, resulting in thinning of the base material and thus losing the design capabilities.

It is an object of the present invention to provide a process for producing clad pipe which overcomes or alleviates the problems with the prior art.

In accordance with the present invention a process for producing clad pipe comprises forming a hollow body of base material, bonding a cladding material metallurgically to the base material to form a composite body and subsequently extruding the composite body to form a pipe.

Preferably, the cladding layer is metallurgically bonded to the base material by depositing a weld overlay on the base material. A suitable method of depositing such a weld overlay would be to use the PROCLAD™ technique of Forth Tool & Valve Limited of Glenrothes, Fife, Scotland.

By metallurgically bonding a cladding layer to the base material it is possible to validate the integrity of the bond prior to extrusion. It has also been found that the extruded product thus formed has fewer bonding flaws compared with the pipes produced in the prior art method. Moreover the finished product exhibits low dilution characteristics in the clad layer, which provides optimum properties in the clad layer to combat against erosion, corrosion or the like.

Preferably, the cladding layer, e.g. the weld overlay, is machined prior to extrusion taking place. The integrity of the metallurgical bond between the cladding layer and the base material may also be validated (e.g. by x-ray or ultrasonic inspection) prior to extrusion.

By the way of example only, a specific embodiment of the present invention will now be described, with reference to the accompanying drawing which is a flow diagram illustrating an embodiment of process in accordance with the present invention.

The Figure illustrates a flow diagram illustrating an embodiment of process for producing a pipe in accordance with the present invention. At step 10 ("step" will hereafter be abbreviated to "S") a tubular billet of suitable base material, of, for example carbon, low alloy or stainless steel, is formed e.g. by the Mannesmann Pilger process. The dimensions of a typical billet might be between 200 mm and 1500 mm in length, between 100 mm and 1500 mm in diameter externally and between 30 mm and 600 mm internally. At S12 a layer of cladding material is metallurgically bonded to the internal surface of the tubular billet. Preferably, the cladding material is deposited on the internal cylindrical face of the billet as a weld overlay. The depth of the cladding is typically from 6 mm to 100 mm.

A suitable method of depositing the weld overlay would be by the use of the PROCLAD™ system of Forth Tool & Valve Limited, Fife, Scotland. The cladding material and the welding conditions will vary with the requirements of the end pipe user. Typically the cladding layer might comprise Inconel 624™ or Incoly 825™ deposited using a hot wire welding process. However, other cladding materials such as Hastalloy C22, 300 Series Stainless Steels, Monel, cobalt based alloys, aluminum bronze and the like can be deposited using hot and cold wire GTAW (Gas Tungsten Arc Welding), dual gas GTAW, plasma transferred arc, powder or hot and cold wire welding processes.

At S14 the welded layer is then machined in order to produce a layer of cladding material of accurate thickness. A typical thickness might be, for example, between 6 mm and 100 mm. At S16 the composite billet may then be inspected for flaws in the bond between the cladding layer and the base layer (e.g. by x-ray or ultrasonic inspection, dye penetrant of Elcometer) and assuming that the composite billet is acceptable at S18 it is extruded to form pipe. Alternatively, or in addition, the inspection may take place prior to machining.

Optionally, at S19 the extruded shell may be further cold worked down into smaller sizes to obtain specific sizes and to control wall thickness tolerances.

At S20, following extrusion (and, optionally, cold reduction), the pipe may then at heat treated in order to establish the mechanical properties of the base pipe, which might typically have a yield strength of between $205 N/mm^2$ and $1030/Nmm^2$. At S22, following heat treatment, a final inspection of the pipe takes place which may include, for example, one or more of radiography, ultrasonic, eddy current and liquid penetration inspections.

Each of steps S10 to S22 is, when considered individually, conventional and well known to those skilled in the art and thus will not be described in detail hereafter.

The resultant pipe comprises an outer base layer and an internal cladding layer which is metallurgically bonded to the base layer. By validating the metallurgical bond using non-destructive methods prior to extrusion, any areas that are unbonded will be detected, which will reduce wastage. Moreover, because the metallurgical bond is achieve prior to extrusion, the cladding thickness is controlled during the extrusion process, avoiding migration of the clad material into the carbon steel by disproportionate amounts and providing optimum properties in the cladding layer to combat against erosion or corrosion.

The invention is not restricted to the details of the foregoing embodiment.

What is claimed is:

1. A process for producing clad pipe, comprising forming a tubular billet of base material, bonding a cladding meterial metallurgiucally to the base material to form a composite body by depositing a weld overlay of the cladding material on the base material and subsequently extruding the composite body to form a pipe.

2. The process as claimed in claim 1, wherein the cladding material is machined prior to extrusion taking place.

3. The process as claimed in claim 1, wherein the integrity of the metallurgical bond between the cladding material and the base material is inspected or validated prior to extrusion.

4. The process as claimed in claim 1, wherein the cladding material is deposited on the internal surface of the tubular billet.

5. The process as claimed in claim 1, further including cold working the clad pipe after extrusion.

6. The process as claimed in claim 1, further including heat treating the clad pipe after extrusion.

7. A pipe produced by the process as claimed in claim 1.

* * * * *